United States Patent [19]

Higuchi et al.

[11] 3,916,342

[45] Oct. 28, 1975

[54] SQUARE WAVE GENERATING CIRCUIT ARRANGEMENT

[75] Inventors: Hobart Atsushi Higuchi; Edward Leroy Mundrick, both of San Jose, Calif.

[73] Assignee: International Business Machines Corporation, Armonk, N.Y.

[22] Filed: July 10, 1974

[21] Appl. No.: 487,410

[52] U.S. Cl. .................. 331/111; 307/268; 328/164

[51] Int. Cl.$^2$ .................. H03K 3/15

[58] Field of Search ........... 331/108, 111, 135, 136; 307/262, 268; 328/164

[56] References Cited

UNITED STATES PATENTS

| | | | |
|---|---|---|---|
| 3,482,188 | 12/1969 | Crouse | 331/135 |
| 3,742,384 | 6/1973 | Breitzmann | 331/108 |
| 3,824,497 | 7/1974 | Schwerdt | 331/108 |

*Primary Examiner*—John Kominski

*Attorney, Agent, or Firm*—George E. Roush

[57] ABSTRACT

An output wave regenerating stage following an operational amplifier stage and arranged within a dual path feedback loop delivers a symmetrical square wave of frequency and symmetry unaffected by ambient temperature and energizing supply potential variations over a broad range. Output voltages swing within the supply potential by a drop equal to the value of the $V_{ce}$ saturation voltage, and low grade operational amplifiers commercially available with non-symmetrical output saturation levels can be used without degrading performance.

9 Claims, 3 Drawing Figures

SQUARE WAVE GENERATING CIRCUIT ARRANGEMENT

The invention relates to square wave generating circuits, and it particularly pertains to such circuits for exciting dc-dc inverting circuit switching arrangements although it is not limited thereto.

The prior art is replete with square wave generating circuits. However, there still are shortcomings. The output voltage swing is limited and the output impedance is degraded in most square wave generating circuits by the associated components, some of which were added to overcome other unfavorable operations.

The closest prior art of which is inventors are aware is found in the following U.S. Pat. Nos. 3,486,133, 12/1969, James, 331-111; 3,656,066, 04/1972, Reynal, 331-65;

and in the literature:

Taylor, David, "Digitally Set Audio Oscillator", Wireless World, February 1970, Page 79;

Breeze, Eric, "Comparator and Multivibrator Add Up To a Linear VCO", Electronics, Aug. 17, 1970, Page 90; and Graeme, J.; Tobey, G. and Huelsman, L.; "Operational Amplifiers, Design and Application", McGraw Hill Book Company, 1971, Page 371.

The patent to James and the publications of Taylor and Graeme et al are directed to feedback oscillators having circuitry loading the a.c. output circuit which seriously affects the output amplitude, wave shape and stability, whereby these circuits are not satisfactory for many purposes.

The patent to Reynal and the publication to Breeze are directed to generators having active device control in the output circuitry of an amplifier with feedback or a monostable pulsing circuit. The publication to Taylor also shows such a device, in the output, but which is merely an emitter-follower circuit. The circuitry of Breeze is arranged for varying timing pulses at one terminal and the monostable pulsing circuit is not a feedback oscillator in the sense of the invention. The circuitry of Reynal comprises a Miller integrator circuit followed by a buffer amplifier and a saturating regenerator in which Zero diodes force saturation and limit the output voltage amplitude. The arrangement delivers an output wave which is at least on the order of three volts above ground and is proportional to the output of the buffer amplifier stage which means that there is a net affect in output voltage in both the pulse and minus mode.

The objects indirectly referred to hereinbefore and those that will appear as the specification progresses are attained in a square wave generating circuit arrangement comprising a regenerating circuit interposed within the feedback loop of a traditional amplifying circuit and feedback loop arrangement. Preferably a differential amplifying circuit is used with positive feedback applied to one input terminal and temperature, and other negative compensating feedback applied to the other input terminal. Circuit components having compensating characteristics are interposed in the feedback loops of opposite variation, for example, positive frequency increase brought about in one of the dual path feedback loops is affected by negative variation, that is, a decrease in frequency, inserted in the other feedback loop. A square wave regenerating circuit is interposed in the feedback loop for assuring substantially perfect square wave output with a wide swing within the value of energizing voltage less only the emitter-collector saturation voltage drop of the semiconductor devices used in the regenerating circuit. Pure square wave output voltage is applied to the feedback loop so that a pair of semiconductor devices comprising the regenerating circuit are switched abruptly by square wave output of the amplifying circuit maintaining a pure square wave form.

In order that the advantages of the invention fully obtain, a preferred embodiment is described hereinafter, by way of example only, with reference to the accompanying drawing, forming a part of the specification and in which.

Figure 1:
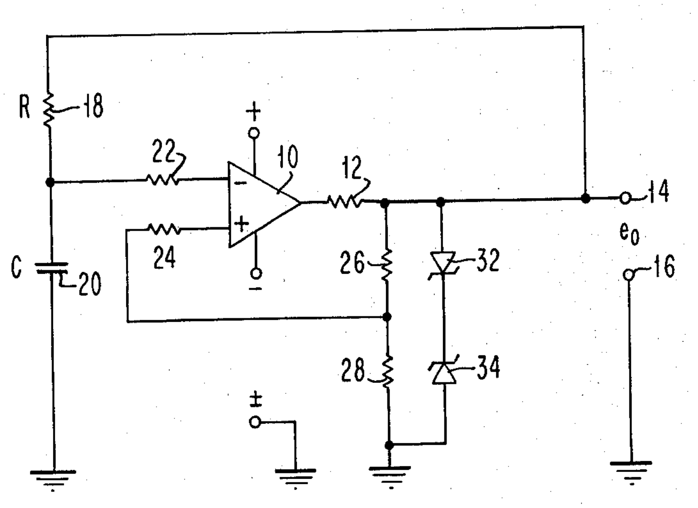
PRIOR ART FIG. 1
FIG. 1 is a prior art square wave generating circuit arrangement.

A prior art square wave generating circuit arrangement is shown in FIG. 1. A differential amplifying circuit 10 is connected in a traditional feedback circuit as described in the text, "Operational Amplifiers, Design and Application", referred to hereinbefore. The output of the amplifier 10 is applied through a resistor 12 to output terminals 14 and 16, the latter of which is connected to a point of fixed reference potential, shown here as ground. The square wave voltage at the output terminal 14 and 16 is applied across the series circuit comprising a resistor 18 and a capacitor 20. The resistance and capacitance values of these components are chosen in accordance with the desired operating frequency as will be described. The junction of the resistor 18 and capacitor 20 is connected by means of a resistor 22 to the negative terminal of the amplifying circuit 10. The positive terminal of the amplifying circuit is connected by means of a resistor 24 to the junction of a pair of series connected resistors 26 and 28 connected across the output terminals 14 and 16. A pair of Zener diodes 32 and 34 are connected in opposite polarity across the resistors 26 and 28. The resistors 26 and 28 are given resistance values such that $$R_{26}/(R_{26} + R_{28}) = 0.462 \quad (1)$$

whereby the period of oscillation $$T = 2R_{18}C_{20}. \quad (2)$$

In this circuit arrangement the amplifier 10 must be energized with a dual power supply having a positive potential and a negative potential balanced with respect to the point of fixed reference potential, shown here as ground. The Zener diodes 32 and 34 furthermore will significantly limit the output voltage swing. In addition, the output impedance appearing at terminals 14 and 16 is degraded by the resistor 12 and the Zener diodes 32 and 34.

Figure 2:
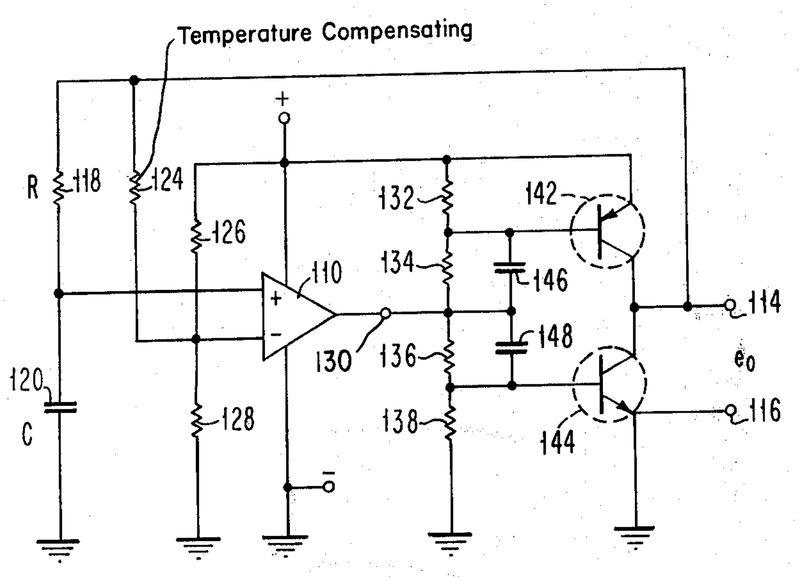
FIG. 2 is a square wave generating circuit arrangement according to the invention.

A circuit arrangement according to the invention is shown in FIG. 2. In this arrangement the timing equations above are equally applicable, but a single power supply having a positive terminal and a negative terminal at reference potential, also shown here as ground, is sufficient. The differential amplifying circuit 110 is arranged to deliver a square wave output voltage at a terminal 130 which is repeated at output terminals 114 and 116. The circuit between the terminal 130 and the terminal 114 is termed a square wave regenerating circuit. A square wave, which may be distorted for one reason or another, is applied to the input terminal of such circuitry and a square wave of undistorted shape is obtained at the output. The square wave appearing at the output terminals 114, 116 is again applied to a series circuit comprising a resistor 118 and a capacitor 120 with the junction therebetween connected to the positive input terminal of the amplifying circuit 110. A resistor 124 is connected to the negative input terminal of the amplifying circuit 110 and to the output terminal 114 for applying an a.c. voltage component to the amplifying circuit biased by a direct biased voltage developed by means of a potentiometer circuit comprising resistors 126 and 128 connected in series across the power supply as shown. The circuit between the terminal 130 and the terminal 114 is termed a square wave regenerating circuit. A square wave which may be distorted for one reason or another, is applied to the input terminal of such circuitry and a square wave of undistorted shape is obtained at the output. The output terminal 130 of the amplifying circuit 110 is connected to the midpoint of a series circuit comprising resistors 132, 134, 136 and 138 connected across the power supply as shown. The remaining junctions between the resistors are connected to the base electrodes of a pair of complementary transistors 142 and 144. The emitter-collector circuits of the transistors are connected in series across the power supply as shown with the junction between the two transistors connected to the output terminal 114. A pair of speed-up capacitors 146 and 148 currently are connected across the resistor 134 and resistor 136 to complete the circuit arrangement.

The values of component parts listed below were used in the construction of one embodiment of a square wave generating circuit arrangement according to the invention.

| Ref. No. | Component | Type or Value |
|---|---|---|
| 110 | Operational Amplifier | Type 709 |
| 118 | Resistor | 13.9 Kilohm |
| 120 | Capacitor | 4–700 Picofarad |
| 124 | Temp. Compensating Series Resistor | 3.48 Kilohm<br>8.06 Kilohm |
| 126 | Resistor | 6.98 Kilohm |
| 128 | Resistor | 6.98 Kilohm |
| 132 | Resistor | 1 Kilohm |
| 134 | Resistor | 10 Kilohm |
| 136 | Resistor | 10 Kilohm |
| 138 | Resistor | 1 Kilohm |
| 142 | NPN Transistor | Type 139-T018 |
| 144 | PNP Transistor | Type 194-T018 |
| 146 | Capacitor | 91 Picofarad |
| 148 | Capacitor | 91 Picofarad |

The energizing power supplied delivered 12 volts (± 10%) direct voltage between the plus terminal and the minus terminal, the latter of which was connected to ground, and a 6.8 microfarod electrolytic capacitor was connected from the positive terminal to ground as the local filtering capacitor. Current flow was 3(± 10%)Ma. The operating frequency lay between 15295 and 15760 Hz ± 50 Hz. The output voltage swing at a load impedance of 10 Kilohms was from +0.2 to 11.8 volts, symmetrically equal to or less than 1.1 percent. Rise and fall times were less than 30 nanoseconds.

Figure 3:
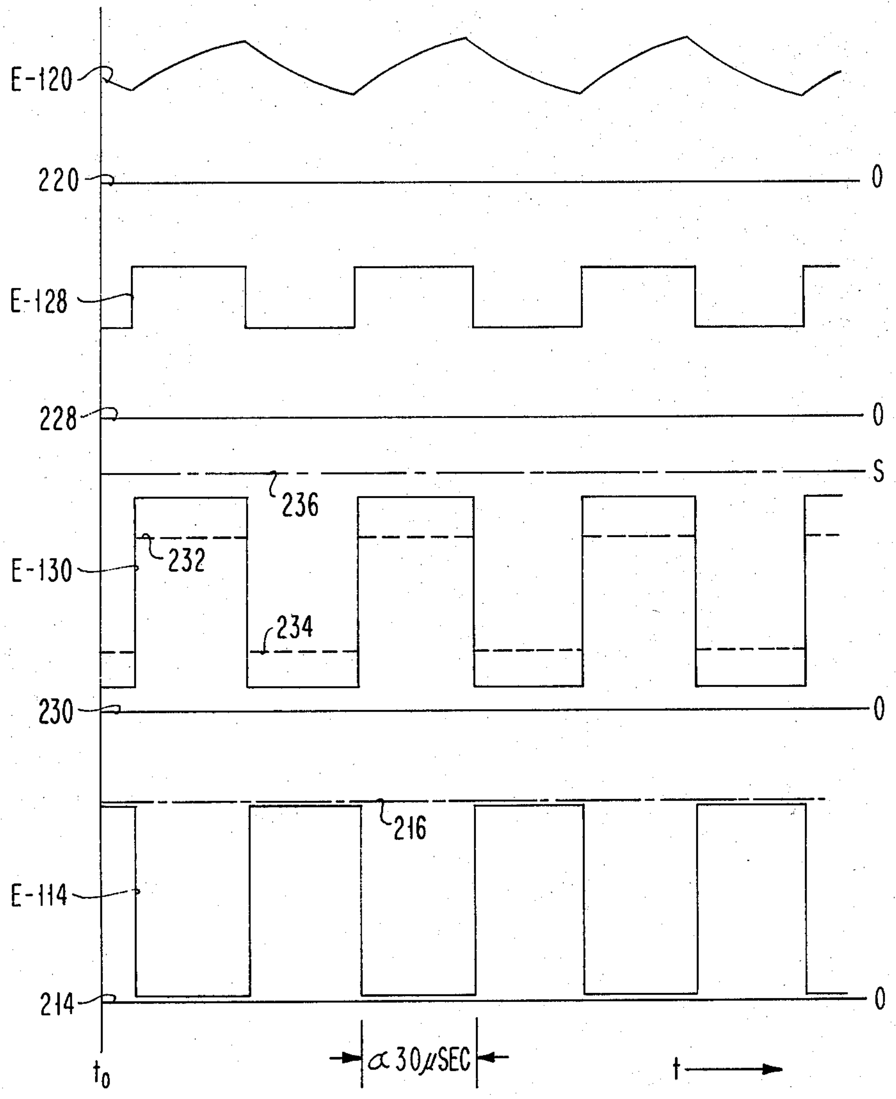
FIG. 3 is a graphical representation of waveforms obtained in one embodiment of the invention.

FIG. 3 is a graphical representation of electric waveforms obtained in an embodiment of the invention as shown in the diagram and having the components listed above. The voltage wave across the capacitor 120 is represented by a curve E-120 for which the zero volt or ground reference level is represented by a line 220. The voltage across the resistor 128 is represented by the curve E-128 above the ground level represented by a curve 228. The output of the amplifier 110 is represented by a curve E-130 above a reference level line 230. Degradation of this wave is indicated by dashed lines 232,234 and the level of the power supply is indicated by a chain line 236. Curves E-114 and 214 represent the output voltage $e_o$ at the terminals 114 and 116 respectively. Again, the power supply level is indicated by a chain line 216.

The voltage across the capacitor 120 and at the errect terminal of the amplifier 110 is rising and falling as the capacitor is charged and discharged by way of the timing resistor 118 to voltage limits determined by the feedback voltage at the inverting input terminal of the amplifier 110 across the resistor 128. As the amplifier switches from one saturated state to the other, the threshold voltage E-128 changes from one limit point of the capacitor voltage to the other because of the current through the feedback resistor 124. The mid point between these two limiting voltages is determined by the voltage divider comprising resistors 126 and 128. If these two resistors are equal in value, the output electric waveform will be a 50–50 duty cycle symmetrical squarewave. Non-symmetrical waveforms as desired are had with unequal resistance values. The output voltage E-114 swings from close to ground or zero volts to nearly the voltage of the power supply as described above. This is quite significant in view of the swing from about +1.0 volts to +11.5 volts at the amplifier output terminal 130. The output squarewave regenerator stage has then increased the voltage swing to within $V_{CD_{SAT}}$ voltage of the transistor measured from ground and the supply voltage. Hence, an operational amplifier with a somewhat degraded voltage swing may be used without loss in circuit performance normally expected.

The operational amplifier 10 in many cases may be a low grade amplifier with non-symmetrical output saturation levels without degrading the performance of the square wave generating circuit in an arrangement having the regenerating circuit within the feedback loop according to the invention. Similarly, the circuit arrangement is insensitive to temperature and supply voltage variations over a wide range.

While the invention has been described in terms of a preferred embodiment and alternatives have been suggested, it should be clearly understood that those skilled in the art will make further changes without departing from the spirit and scope of the invention as defined in the appended claims.

The invention claimed is:

1. A square wave generating circuit arrangement comprising a pair of output terminals across which a square wave voltage is delivered, a differential amplifying circuit having one input terminal, another input terminal complementary to said one input terminal and an output terminal, a feedback loop circuit, comprising a resistive element connected between one of said voltage output terminals and said one input terminal of said amplifier circuit, a capacitive element connected between said one input terminal of said amplifier circuit and a point of fixed potential, a resistance element connected between said one voltage output terminal and said complementary input terminal of said amplifying circuit, and a square wave regenerating circuit having an input terminal directly connected to said amplifying circuit and an output terminal directly connected to said one voltage output terminal.

2. A square wave generating circuit arrangement as defined in claim 1 and wherein, said regenerating circuit comprising a pair of complementary transistors having collector electrodes connected in common whereby the collector-emitter electron flow paths are connected in series and each having base electrodes, said output terminal being constituted by the junction between the interconnected collector electrodes of said transistors, a direct voltage divider comprising four resistors connected in series, said input terminal being constituted by the junction between the intermediate resistors of the series, and said base electrodes of said transistors being directly and individually connected to the other junctions between the resistors of the series.

3. A square wave generating circuit arrangement as defined in claim 1 and wherein said resistance element comprises a temperature compensating component.

4. A square wave generating circuit arrangement as defined in claim 1 and incorporating a direct bias potential network connected to said complementary input terminal of said amplifying circuit and across the energizing potential supply, thereby to compensate for variations in the energizing supply.

5. A square wave generating circuit arrangement as defined in claim 4 and wherein, one of said output terminals, one terminal of said bias potential network, and one terminal of said source of energizing potential are all connected to said point of fixed potential.

6. A square wave generating circuit arrangement as defined in claim 1 and wherein said square wave regenerating circuit comprises a pair of complementary transistors having collector electrodes connected in common to said output terminal emitter electrodes and base electrodes, circuitry for applying energizing potential across the emitter-collector electron flow paths of said transistors in series, four resistors connected in series across said series connected emitter-collector electron flow paths, an electric connection between said input terminal and the central junction of the series connected resistors, and individual electric connections between the remaining junctions between said resistors and said base electrodes of said transistors.

7. A square wave generating circuit arrangement as defined in claim 6 and incorporating capacitors individually connected between said input terminal and said base electrodes of said transistors.

8. A square wave generating circuit arrangement as defined in claim 6 and wherein the emitter electrode of one of said transistors is connected to said point of fixed potential.

9. A square wave generating circuit arrangement comprising a pair of output terminals across which a square wave voltage is delivered, an amplifying circuit having at least one input terminal and having an output terminal, a feedback loop circuit, comprising a resistive element connected between one of said voltage output terminals and said one input terminal of said amplifying circuit, a capacitive element connected between said one input terminal of said amplifying circuit and a point of fixed potential, a pair of complementary transistors having collector electrodes connected in common to said output terminal, emitter electrodes and base electrodes, circuitry for applying energizing potential across the emitter-collector electron flow paths of said transistors in series, four resistors connected in series across said series connected emitter-collector electron flow paths, an electric connection between said output terminal of said amplifying circuit and the central junction of the series connected resistors, and individual electric connections between the remaining junctions between said resistors and said base electrodes of said transistors.

* * * * *